May 11, 1926.
R. CHAMBERS
ADJUSTABLE HOLDER
Filed April 9, 1925
1,584,509
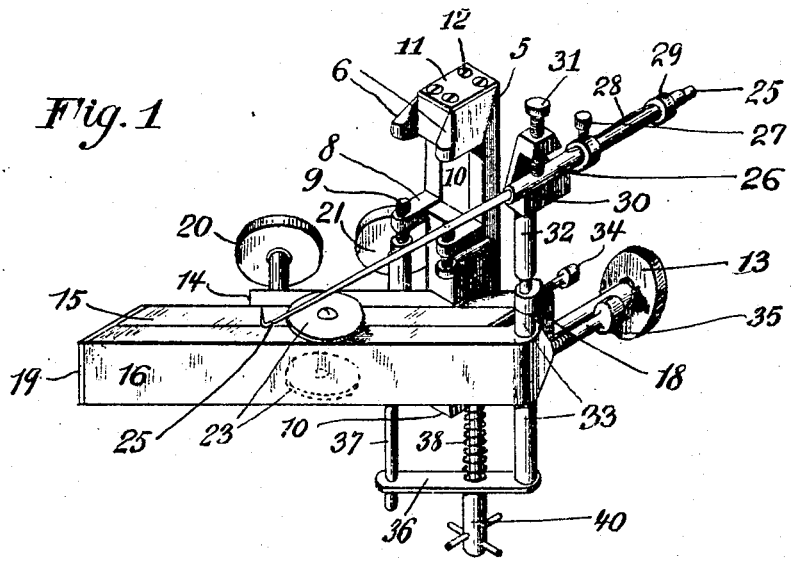
Fig. 1
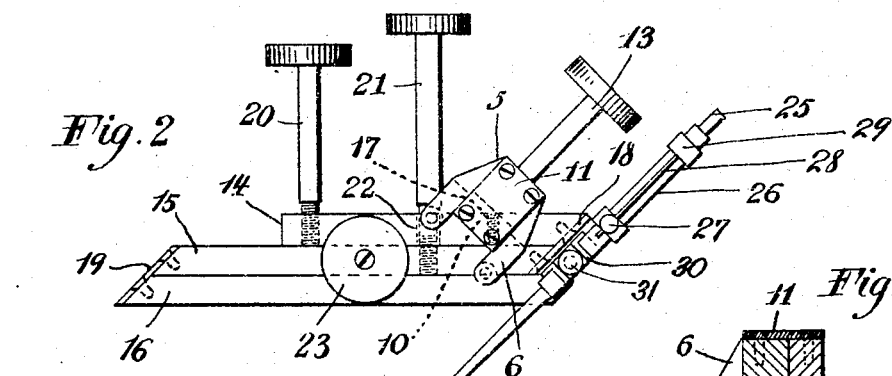
Fig. 2
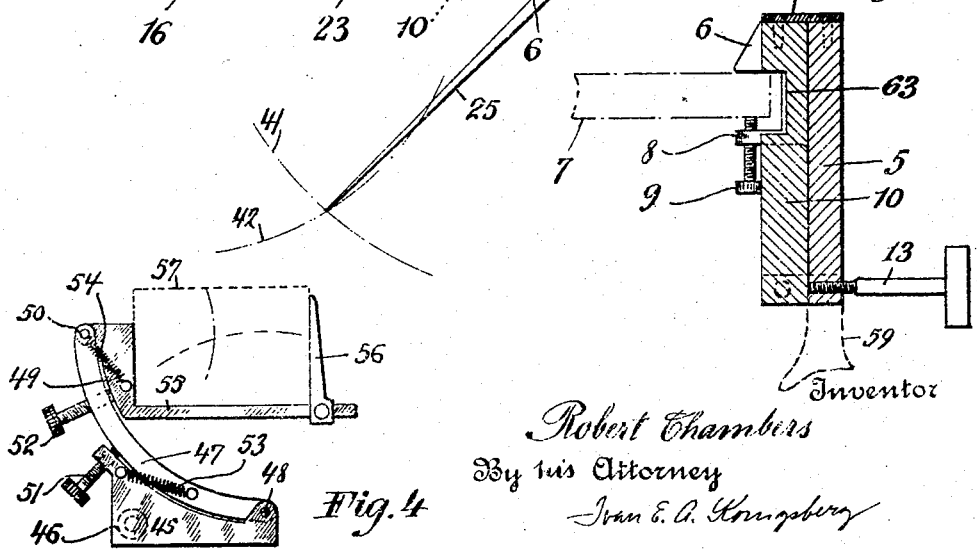
Fig. 3
Fig. 4
Robert Chambers
By his Attorney
Ivan E. A. Kongsberg
Inventor

Patented May 11, 1926.

1,584,509

UNITED STATES PATENT OFFICE.

ROBERT CHAMBERS, OF NEW YORK, N. Y.

ADJUSTABLE HOLDER.

Application filed April 9, 1925. Serial No. 21,994.

This invention relates to adjustable holders and more particularly to a holder—known as a "micro-manipulator"—for manipulating a dissecting needle or micro-pipette in various vertical, horizontal, and other directions in the field of any of the magnifications of a compound microscope.

The apparatus embodying the present invention is especially useful for, though not limited to, the manipulation of instruments to dissect living cells or other microscopic objects in the focal view of a high powered microscope.

In the study of living cells under microscopes of the highest magnification, it has been found necessary to dissect the cells for a proper understanding of the physical properties of protoplasm and their structural components. The only instrument hitherto used for this purpose is the Barber apparatus which will be briefly described in order to make clear the purpose of the present invention.

In the Barber apparatus, a moist chamber, open at one end and having sides from 8 to 12 mm. high, is placed on the microscope so that it may be moved about with the mechanical stage thereof. This chamber is roofed over with a carefully cleaned overslip on the under surface of which the specimen is mounted in a shallow hanging drop of a physiologically indifferent liquid. A dissecting needle is made by drawing out one end of a piece of glass tubing and bending it at right angles for two or three millimeters from the pointed tip. A needle holder which is a mechanism permitting three movements, is clamped to one side of the mechanical stage of the microscope, the dissecting needle clamped in position thereon, and the holder operated until the needle projects into the moist chamber with its tip pointing up into the hanging drop. By proper adjustment of the holder the cell to be dissected and the tip of the needle are carefully brought into the same focal field of the high powered microscope. The three movements of the needle, permitted by the needle holder, and the two movements of the moist chamber, permitted by the mechanical stage, give the experimenter ample opportunity to carry on dissection under the highest magnification of the microscope.

In constructing the micro-dissection instrument it is of the utmost importance that the two horizontal movements of the needle holder run true and keep the needle tip always in the same plane. Otherwise, at a crictical moment in the dissection, a reversal of a horizontal adjusting screw may either suddenly lower the needle tip out of focus or jam it against the coverslip and break it.

Of equal importance is the elimination of lost motion in the moving parts of the adjustable needle holder. This condition which cannot be eliminated in adjustable holders employing such means as gears, racks and slides, makes it difficult to accurately control the manipulation of the needle tip, particularly when it is realized that the object under observation is invisible to the naked eye.

The present invention has for its object to provide a needle holder capable of two right-angled movements in the horizontal plane and a movement in a vertical plane together with various intermediate combination movements and vertical adjustment of the needle carrier, and complete elimination of lost motion in the moving parts of the holder.

One object of the invention is to provide an adustable holder adapted to carry a micro-pipette for isolating bacteria and protozoa, and for manipulating single animal and plant cells either for dissection or injection.

A further object is to provide means for marking microscopic regions on a slide, and to provide an apparatus in which any combination of three movements may be used in precision instruments, such as, moving two cross hairs into proper alignment.

A further object is to provide an adjustable holder for any other purpose which has few parts, is simple in construction, easy to manipulate, and one which will maintain its accuracy and smoothness of action indefinitely.

In the drawings illustrating the invention—

Figure 1 is a perspective view in assembled relation of the parts comprising the invention, Figure 2 is a plan view.

Figure 3 is a vertical sectional view on line 3—3 of Figure 1 with parts omitted.

Figure 4 illustrates a modification.

Referring to the drawing, more particularly Figure 3, a vertical supporting bar 5 is provided at its upper end with a pair of offset laterally extending lugs 6, 6 adapted to rest upon the stage 7 of a microscope or other support. A pair of lower lugs 8, 8 form bearings for a pair of clamping screws 9, 9 which cooperate with the lugs 6 to clamp the holder to the stage. The upper portion of the bar 5 is further recessed between the lugs 6 to receive a movable vertical bar 10. The two bars 5 and 10 are hingedly connected at their tops by means of a spring plate 11 secured by screws 12. The bar 10 is recessed as at 13 to allow proper clearance for the edge of the stage 7, so that the bar 10 may be adjusted with respect to the bar 5 without contacting with the stage.

The numeral 63 denotes an adjusting screw in threaded engagement with bar 5. By manipulating the screw, the bar 10 may be adjusted towards or away from bar 5.

Angularly positioned with respect to the bar 10 and supported thereon are the three horizontal adjusting bars 14, 15 and 16. The bar 14 is secured rigidly to the bar 10 by means of a screw 17, Figure 2.

The bars 14 and 15 are hingedly connected at one end by a spring 18, and the bars 15 and 16 are hingedly connected at the opposite end by a similar spring 19. The three bars are in nested relation throughout their entire length, with bar 15 occupying the middle position.

An adjusting screw 20 is in threaded engagement with the bar 14 and bears against the bar 15. Another adjusting screw 21 passes through a smooth bore 22 in the bar 14 and is in threaded engagement with the bar 15. The screw 21 bears against the bar 16.

The three bars 14, 15 and 16 are guided in a true horizontal plane by means of two disks, one above and one below the bars and marked 23.

The micro-pipette or needle 25 is preferably first adjusted in a needle holder 26 and clamped by means of a screw 27 which bears against a spring 28 fixed in the needle holder at 29.

The needle holder is thereafter placed in the universal needle carrier 30 and clamped in position by a screw 31. The latter may be screwed down firmly as it bears against the metal needle holder 26 and not against the glass needle itself. The needle carrier has a shank 32 mounted for vertical adjustment in a hollow post 33. Adjustment is effected by means of a screw 34.

The post 33 is in turn adjustably mounted in the bar 16 by means of another screw 35. The lower end of post 33 carries a guide plate 36, the opposite end of which slides vertically on a guide pin 37 in bar 16. A spring 38 urges the plate 36 downward. Upward movement against the force of the spring is effected by an adjusting screw 40.

The operation of the holder is as follows. The bar 5 is first rigidly clamped to the microscope stage by clamping means 9. Thereafter the needle 25 is adjusted in the needle holder 26 and clamped in the needle carrier 30. Coarse vertical adjustment of the needle is effected by means of the screw 34 and fine adjustment by the screw 40. When finally adjusted the needle is clamped firmly in position by screw 35.

Up and down movements of the needle under the microscope is effected by manipulating vertical adjusting screw 63 which bears against bar 10 which in turn supports the holder means. And movements of the point of the needle in two directions at right angles is effected by first turning screw 20 which causes bars 15 and 16 to swing on the hinge member 18, while manipulation of the screw 21 causes bar 16 to swing on hinge member 19. The arcs 41 and 42 indicate the horizontal adjustments of the needle. The spring hinge members of course force the respective bars back into initial position.

The modification illustrated in Figure 4 embodies the horizontal adjustments provided by the invention in that a base 45 is provided adapted to be suitably clamped in position by clamping means 46. A bar 47 is pivoted to the base at 48, and another bar 49 is pivoted to bar 47 at 50. Adjusting screws 51 and 52 operate the bars 47 and 49 respectively. Springs 53 and 54 return the bars to initial positions.

Bar 49 may conveniently carry a holder 55 having an adjustable outer arm 56, so that, for instance, a glass slide 57 may be secured in the holder and properly manipulated on a microscope stage by operating the screws 51 and 52, all in an obvious manner.

The instrument shown in Figure 4 may be made very economically and furnishes an inexpensive holder for students use or similar work not requiring the holder described above. In the latter case, bar 5 may have a base or pedestal indicated at 59 for supporting the holder on the base of a microscope or other instrument, and not necessarily on the stage thereof.

It should be particularly noted that in each of the above forms of adjustable holder all of the horizontal and vertical adjusting screws, when rotated forwardly, must oppose the resilient spring hinges connecting the respective bars. This arrangement effectively and permanently eliminates lost motion in any of the moving parts of the device.

It will thus be seen that there is herein described apparatus in which the several features of this invention have been embodied. As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:—

1. The combination with a micro-pipette or like device, of a holder therefor, yielding means for adjustably clamping said device in said holder, supporting means and mechanism for independently adjusting said device vertically and horizontally.

2. In a device of the class described, an upright post provided with a clamp, an upright member hingedly connected to said post, an adjusting screw threaded through the post and coacting with said member, and an adjustably mounted clamp supported by said member.

3. In a device of the class described, an upright post provided with a clamp, an upright member hingedly connected to said post, an adjusting screw threaded through the post and coacting with said member, a horizontally-extending member rigidly secured to said upright member, a second horizontal member hingedly connected to the said horizontally-extending member, an adjusting screw threaded in the first horizontal member and co-acting with the second horizontal member, and an adjustable clamp on the last named member.

4. In a device of the class described, an upright post provided with a clamp, an upright member hingedly connected to said post, an adjusting screw threaded through the post and coacting with said upright member, a horizontal member rigidly secured to said upright member, an adjusting screw threaded through the horizontal member, a second horizontal member hingedly connected to the first named horizontal member and coacting with its adjusting screw, an adjusting screw extending loosely through an aperture in the first named horizontal member and threaded through the second named horizontal member, a third horizontal member hingedly connected to the second named horizontal member and coacting with the last named screw, and a carrier mounted on the free end of the third horizontal member.

5. A device of the character described comprising a base, a supporting bar pivoted thereto, a second bar pivoted to the said first bar, adjusting screws for operating said bars on their hinges independent of each other, springs for returning said bars to initial positions and a holder secured to the said second bars.

ROBERT CHAMBERS.